United States Patent

[11] 3,587,346

| [72] | Inventors | Koichi Takahashi;<br>Nobuteru Hitomi, Yokohama, Japan |
|---|---|---|
| [21] | Appl. No. | 818,671 |
| [22] | Filed | Apr. 23, 1969 |
| [45] | Patented | June 28, 1971 |
| [73] | Assignee | Nissan Motor Company, Limited,<br>Yokohama, Japan |

[54] AUTOMOTIVE DIFFERENTIAL MECHANISM OF LIMITED-SLIP TYPE
9 Claims, 18 Drawing Figs.

| [52] | U.S. Cl. | 74/710.5 |
|---|---|---|
| [51] | Int. Cl. | F16h 1/44 |
| [50] | Field of Search | 74/710.5;<br>74/711 |

[56] References Cited
UNITED STATES PATENTS

| 2,762,240 | 9/1956 | Eckert | 74/710.5 |
| 3,053,114 | 9/1962 | Singer | 74/710.5X |
| 3,186,258 | 6/1965 | Meldola | 74/710.5 |
| 3,253,672 | 5/1966 | Mikina | 74/710.5X |
| 3,390,593 | 7/1968 | Brownyer | 74/710.5 |

*Primary Examiner*—Leonard H. Gerin
*Attorneys*—Robert E. Burns and Emmansuel J. Lobato ABSTRACT: An automotive differential mechanism of limited-slip type, the mechanism being of the character which is adapted to prevent a rear axle wheel from spinning idly when the running resistance in the wheel is reduced with a reduced traction transmitted to the other rear wheel. As soon as one of the rear wheels is on a low traction surface, a limitation is exercised on the differential action of the differential gearing by the compiling of a force to the clutch of the differential mechanism as caused by a twisting action of its center ring.

PATENTED JUN 28 1971
3,587,346
SHEET 4 OF 6

AUTOMOTIVE DIFFERENTIAL MECHANISM OF LIMITED-SLIP TYPE

The invention is concerned with a differential mechanism of an automobile and has particular reference to a differential mechanism of limited-slip type in which the power locking is effected by means the torque transmitted to the differential gearing.

In existing differential mechanisms presently in common use for the rear axles of automobiles it sometimes happens that as the running resistance in either of the rear wheels is reduced markedly, the axle shaft connected with the particular wheel tends to spin or "idle away" due to the differential action, with the result that substantially no traction is transmitted to the axle shaft of the other rear wheel. This invention provides a new and improved differential mechanism of the character in which substantially no spinning is encountered in either of the axle shafts even when the automobile rounds a sharp turn.

The invention requires a specially constructed center ring and a pair of pressure rings mounted in the differential case, whereby, as the automobile rounds a curve and one of the rear wheels is cleared of running resistance, a restriction is exercised on the differential action by a force coupled to the clutch as caused by a twisting action of the center ring. In the drawing.

Figure 1:
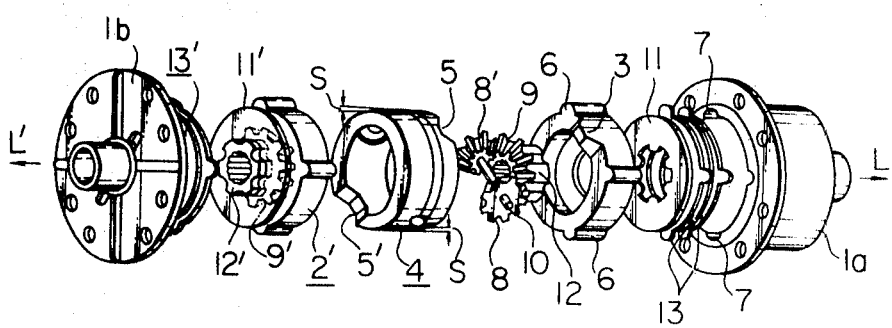
FIG. 1 is an exploded view of the differential according to the invention.
Figure 2:
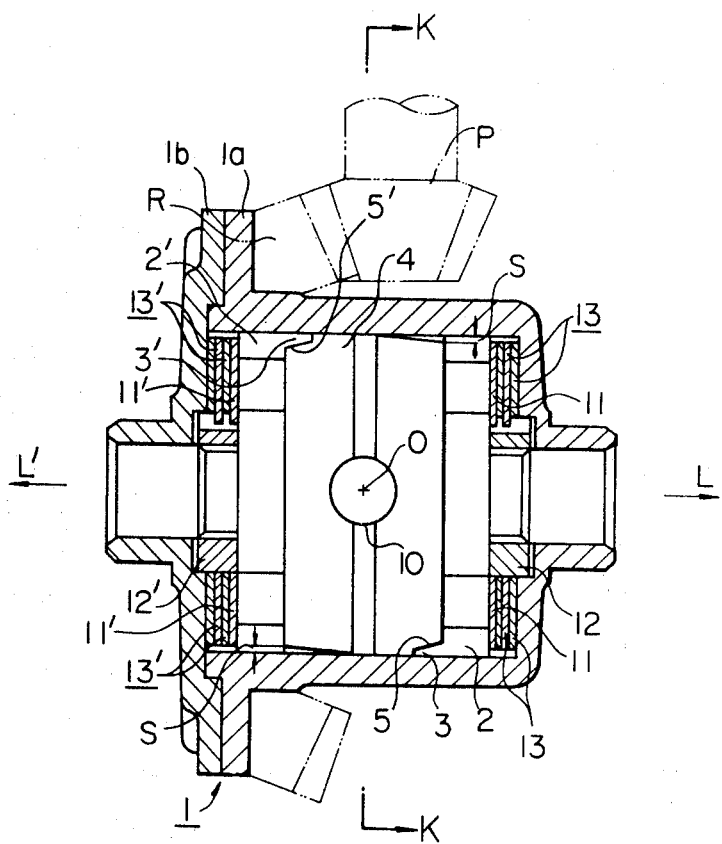
FIG. 2 is an axial section view showing the differential illustrated in FIG. 1.
Figure 3:
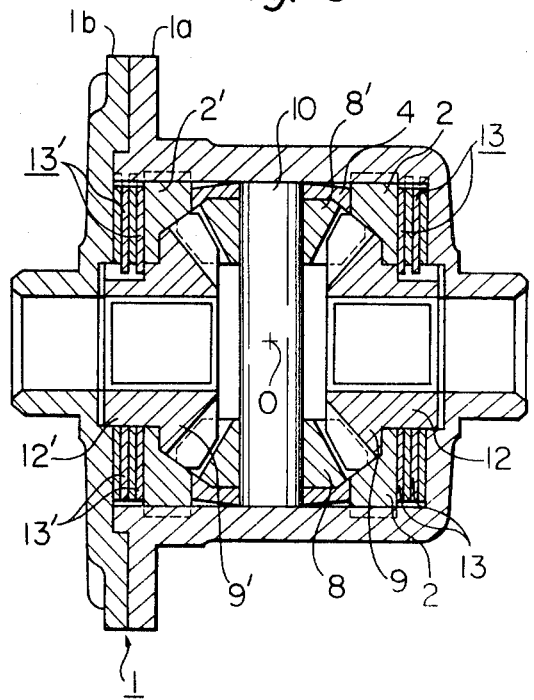
FIG. 3 is the sectional view taken along line L–L' of FIG. 2.

First, referring to FIGS. 1 to 3, the differential according to the invention consists essentially of a differential case 1 having housing and flange halves 1a and 1b, respectively, a pair of pressure rings 2 and 2' having wedge portions 3 and 3', respectively, and a center ring 4 having recess portions 5 and 5' corresponding in shape to and mating with the wedges portions 3 and 3', respectively. The recess portion 5 is so located in the center ring 4 that it is symmetrical with the recess portion 5' with respect to the center point 0 of the center ring, as best seen from FIG. 2. The center point 0 is the point at which the axis of the axle shaft, as indicated by line L–L', intersects the axis of the pinion mate shaft which is coupled diametrically with the center ring, as described below.

Although the wedge portions 3 and 3' are shown to be provided on the pressure rings 2 and 2', respectively, with the recess portions 5 and 5' provided in the center ring 4, they may be reversed. Furthermore, the location and shape of the wedge and recess portions may be changed in a desired way as long as they form a pair of slopes corresponding to the opposite pair of slopes.

The pressure rings 2 and 2' are splined to the housing half 1a of the differential case 1 through cooperation of the spline teeth 6 on the rings and spline grooves 7 of the housing half 1a Although the splines are shown to be four in number, any suitable number of splines may be used. The center ring 4, held between the pressure ring, is thus permitted to slide in the axial direction L–L' within the housing half 1a.

The external wall of the center ring 4 is axially sloped from its center toward its peripheral edges so that the ring is fitted snugly into the housing half 1a, but with gaps that permit the center ring to be inclined within the differential case about the center point 0. The maximum gap between the sloped wall and the housing is indicated at S in FIGS. 1 and 2.

The differential gearing of the differential according to the invention is made up of a pair of differential pinions 8 and 8' and a pair of side gears 9 and 9' mating with the pinions 8 and 8'. The pinions 8 and 8' are interconnected through a pinion mate shaft 10 which is forced through the center ring 4 in a diametrical direction so as to rotatably carry the pinions 8 and 8'.

The multiple-disc clutch of the differential mechanism comprises a pair of clutch plates 11 and 11' to which are splined, respectively, the side gears 9 and 9' through the bosses 12 and 12' extending outwardly from the gears 9 and 9', respectively, and a pair of stacks 13 and 13' of clutch plates engaging respectively with the housing and flange halves 1a and 1b.

The driving power supplied from the engine (not shown) is delivered to the housing half 1a through the drive pinion P and ring gear R as is customary and, thereafter, is transmitted to the pressure rings 2 and 2' by way of the spline teeth and grooves 6 and 7, respectively. THe center ring, on the other hand, is interlocked with the axle shafts through the pinion mate shaft 10, differential pinions 8 and 8' and side gears 9 and 9' and is subjected to the running resistance occurring in the rear wheels.

Figure 4:
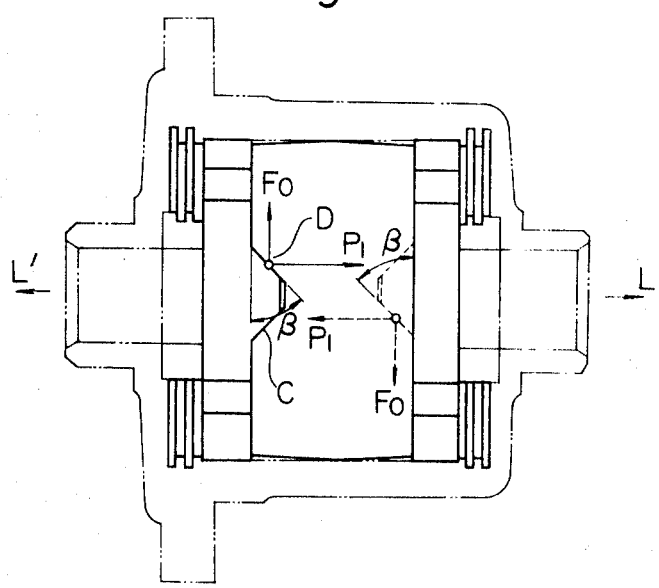
FIGS. 4 to 6 are views for the schematic analysis of the forces established at the center ring and pressure rings used in the mechanism of the invention.
Figure 5:
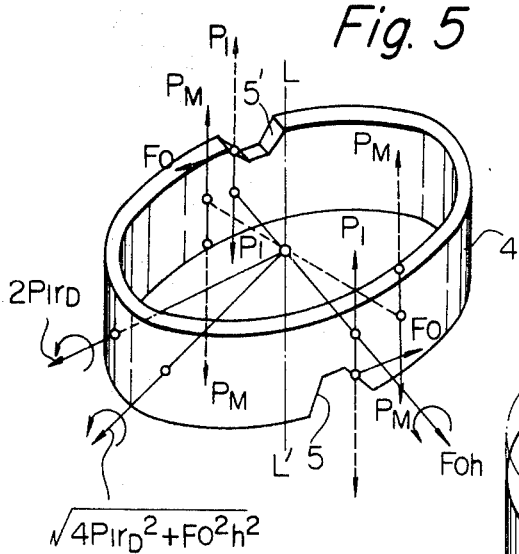

It follows, therefore, that when the driving power transmitted to the slopes of the wedge portions 3 and 3' is balanced with the running resistance transmitted to the slopes of the recess portions 5 and 5', there develops a certain force between the pressure rings and center ring in the direction of L–L' as indicated by $P_1$ in FIGS. 4 and 5.

Assuming that the driving torque to be transmitted to the differential case 1 is $T_o$ and the effective radius of the pressure rings 2 and 2' $r_D$, then the force $F_c$ to be transferred by one pressure ring is:

$$Fo = \frac{To}{2r_D} \quad \text{(Equation 1)}$$

Hence, if the portions 3 and 3' (and accordingly the portions 5 and 5') are wedged at the angle of $\beta$ as indicated in FIG. 4, then the force $P_1$ is expressed as:

$$P_1 = Fo \cdot \cot\beta \quad \text{(Equation 2)}$$

Since the recess portions 5 and 5' are disposed symmetrically with each other with respect to the center point 0, the force $P_1$ exerted on one wedge portion 3 or 3' from one pressure ring 2 or 2' acts to depress the opposite pressure ring 2' or 2 at the recess portion 5' or 5, respectively. This will mean that a combined moment of a moment resulting from a pair of the forces $P_1$ and a moment resulting from a pair of the forces $Fo$ is imparted to the center ring 4, which combined moment acts in such a manner as to twist the center ring about the center point 0 in the axial direction L–L', as illustrated in FIGS. 4 and 5. The combined moment built up in the center ring 4 induces a balancing force $P_M$ against the pressure rings 2 and 2'.

Figure 6:
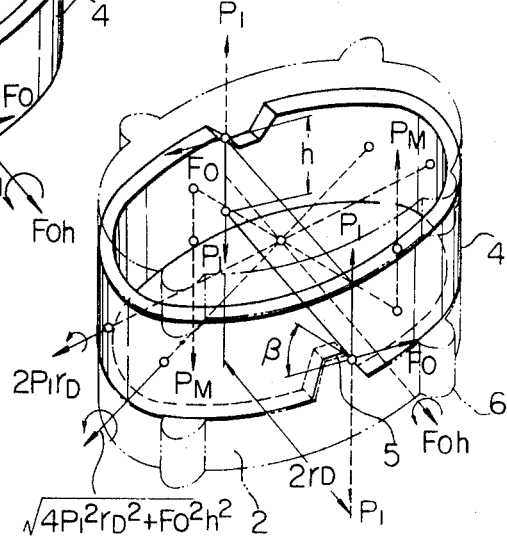
Figure 7:
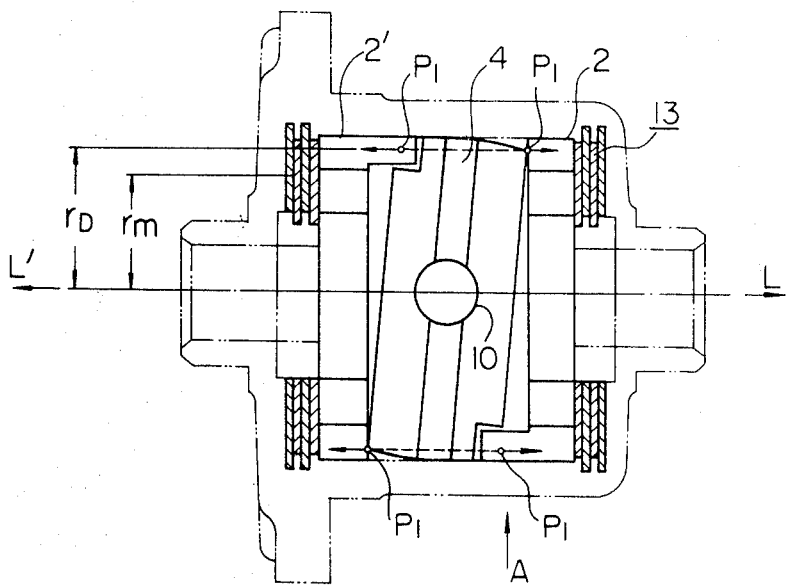
FIG. 7 is a view showing the principle of operation of the differential.
Figure 8:
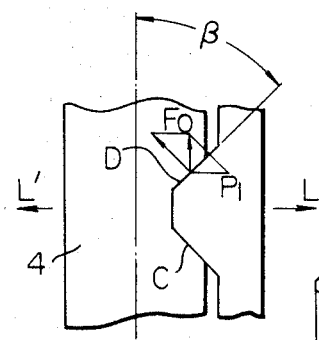
FIG. 8 is a view showing the relative positions of the center and pressure rings when seen from the arrow A of FIG. 7.

More specifically, assuming the distance between the working points of the two recess portions 5 and 5' to be $h$ when measured along the axis L–L', and $2r_D$ measured perpendicular to the axial direction as shown in FIG. 6, then the moment established by the pairs of the forces $P_1$ and $Fo$ is $Foh$ and $2P_1 r_D$, respectively. The combined moment of these pairs is, therefore, expressed as:

$$\sqrt{4P_1^2 a r_D^2 + Fo^2 h^2}$$

The moment thus expressed acts upon the recess portions 5 and 5' with a force amounting to $$P_M = \frac{Fo\sqrt{h^2 - 4r_D^2 \cdot \cot^2 \beta}}{2r_D} \quad \text{(Equation 3)}$$

The force $P_M$ is balanced with the combined moment exerted to the pressure rings 2 and 2' and is transferred to the opposite pressure rings 2' and 2 so that the sum of the force $P_M$ and the counterforce $P_1$ exerted on the wedge portions 3 and 3' is applied to the pressure rings 2 and 2'. It therefore follows that one pressure ring undergoes a force $P_F$, which is expressed as $$P_{F'} = P_1 + P_M$$

$$= Fo\left(\cot \beta + \frac{\sqrt{r^2 - 4rD^2 \cdot \cot^2 \beta}}{2r_D}\right)$$

(Equation 4)

Hence, if the thrust caused by the side gears 9 and 9' is to be neglected, then the total force $P_F$ to be exercised on the two pressure rings 2 and 2' is represented by $$P_F = \frac{To}{rD}\left(\cot \beta + \frac{\sqrt{h^2 + 4rD^2 \cdot \cot^2 \beta}}{2r_D}\right) \quad \text{(Equation 5)}$$

from which it is observed that the force which acts to limit the differential action increases in proportion to the amount of the input torque $To$.

It will be noted in this instance that although the slopes of the wedge and recess portions are assumed to be angled at $\beta$, one slope of each of the portions 3 and 5 and 3' and 5' may be differently angled from the opposite slope so as to have available a different locking effect the driving operation of the engine.

In operation, when the automobile is running straight, the pinion and ring gears P and R, which are being driven from the engine, cause the differential cases 1 and 1' to rotate. In the absence of a difference in the revolution speeds of the two axle shafts, the differential case 1, pressure rings 2 and 2', center ring 4, pinion mate shaft 10, differential pinions 8 and 8', and side gears 9 and 9' do work without any relative motions therebetween. As a consequence, there occurs no relative rotation between the differential case 1 and side gears 9 and 9' so that the force $P_F$, as exerted on the clutch plates 11 and 11', and 13 and 13', invites no frictional force therebetween.

Once a relative rotation takes place between the differential case 1 and side gears 9 and 9' however, the force $P_F$ is transmitted to the multiple-disc clutch sets so as to create a frictional force between the clutch plates 11 and 13 and between the clutch plates 11' and 13'. If the working radius of the clutch plates is the friction coefficient of the clutch plates is $\mu$, and the total number of the frictional faces is N, then the braking torque caused in the clutches is represented by:

$$\frac{To}{r_D}\cdot\left(\cot \beta + \frac{\sqrt{h^2 + 4r_D^2 \cdot \cot^2 \beta}}{2r_D}\right) r_m \cdot \mu \cdot N$$

(Equation 6)

The braking torque thus expressed acts in such a manner as to cancel the difference between the revolution speeds of the two axle shafts.

When, on the other hand, a differential action is required while the automobile is rounding a curve, the running resistance in one rear wheel overcomes the braking torque so that the one axle shaft rotates at a speed different from the other shaft. Since, in this instance, the driving torque $To$ transmitted to the differential case 1 is rather small, and, accordingly, the braking torque in the clutch plates is under a considerably low limit, the differential action is still maintained.

If, however, a spin or slip is encountered in the rear wheel, for example when the automobile is on a curve, an increased amount of driving power is transmitted to the differential case so as to increase the braking torque to be exerted on the clutch plates, thereby inhibiting the relative rotation between the differential case 1 and side gears 9 and 9' and consequently limiting the differential rotation of the two axle shafts. When the differential case is driven from the axle shafts, as when the automobile is coasting, a force is established at the opposite side, as indicated at C if the force develops at the side D when the differential case is driven from the gears P and R. In this case, too, a braking torque is exerted on the clutch plates.

It may also be mentioned that the faces of the center ring 4 which are opposite the recess portions 5 and 5' may be crowned to protect them against excessive impact with the pressure rings.

The performance quality of limiting a differential action is often evaluated in terms of torque ration, which refers to the ratio of a torque of the axle shaft, which rotates at a high speed or which encounters slipping, to a torque of the axle shaft which rotates at reduced speed or which has ceased rotation due to the differential rotation. The torque ratio $R_T$ of the differential mechanism described and shown is:

$$R_T = \frac{r_D + \mu \cdot r_m \cdot N \{\cot \beta + \sqrt{h^2 + 4r_D^2 \cdot \cot^2 \beta}/2r_D\}}{r_D - \mu \cdot r_m \cdot N \{\cot \beta + \sqrt{h^2 + 4r_D^2 \cdot \cot^2 \beta}/2r_D\}}$$

(Equation 7)

where $\mu$ represents a friction coefficient between the clutch plates.

The torque ration $R_T$ may be determined according to the type and purpose of the automobile, and is usually about 1.5 for an ordinary passenger car and over 1.5 for a racing car.

Figure 9:
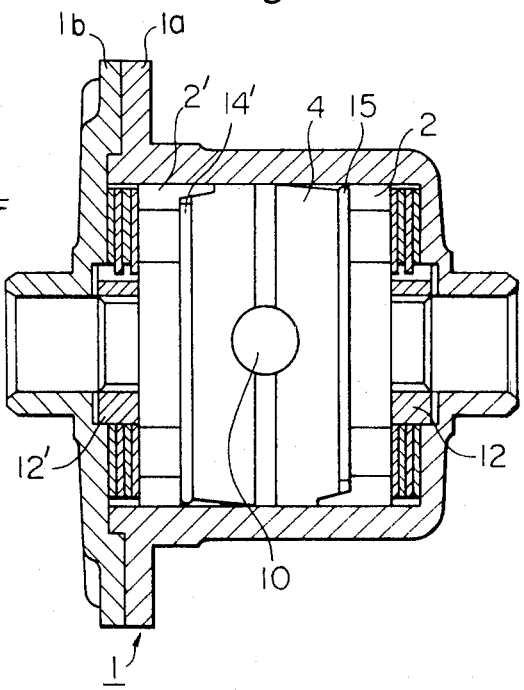
FIG. 9 is a view similar to FIG. 2 but showing another form of the differential.

In order to facilitate the limitation of the differential action in the differential mechanism described and shown so far, a pair of spring means 14 and 14' may be inserted between the center ring 4 and pressure rings 2 and 2', as illustrated in cross section in FIG. 9. If, in this instance, the forces of the spring means 14 and 14' increase to $P_x$, then the resultant torque ratio of the differential mechanism will be expressed as:

$$R_T = \frac{To + \mu \cdot r_m \cdot N\left\{\frac{To}{r_D}(\cot \beta + \sqrt{h^2 + 4r_D^2 \cdot \cot^2 \beta}/2r_D) + P_x\right\}}{To - \mu \cdot r_m \cdot N\left\{\frac{To}{r_D}(\cot \beta + \sqrt{h^2 + 4r_D^2 \cdot \cot^2 \beta}/2r_D) + P_x\right\}}$$

(Equation 8)

from which it is observed that the differential action can be subjected to a limitation even though the driving torque is reduced to zero.

Figure 10:
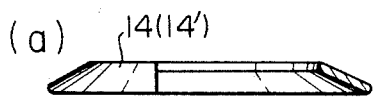
FIGS. 10a and 10b are cross-sectional and top plan views, respectively, of the spring means used in the differential shown in FIG. 9.
Figure 10:
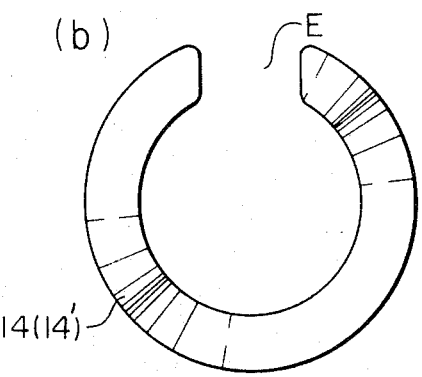
Figure 11:
FIGS. 11a and 11b are similar to FIGS. 10a and 10b, respectively, but show another form of the spring means.
Figure 11:
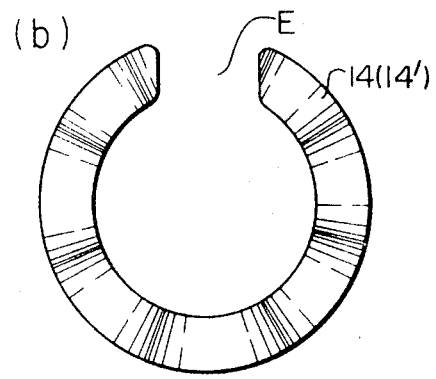

The spring means 14 and 14' may be configured in a suitable manner to achieve the above mentioned purpose and a preferred example is shown in FIGS. 10a and 10b. As illustrated, the spring means is constituted as a unitary dished ring spring, with a portion E removed for reception of the wedge portion 3 or 3' of the pressure rings. If preferred, the ring spring may be corrugated as illustrated in FIGS. 11a and 11b.

Although only two springs are shown, three or more of them may be used for an increased limitation effect of the differential action.

Figure 12:
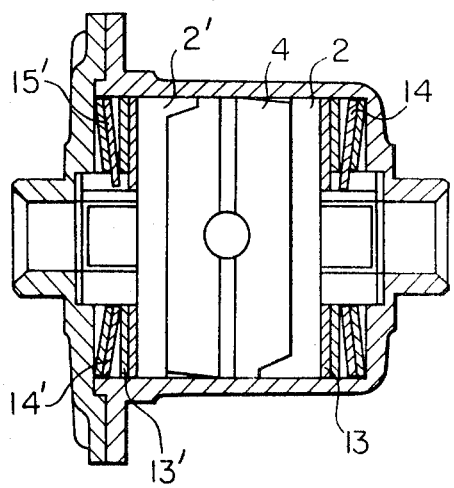
FIG. 12 is similar to FIG. 9 but shows a further modified form of the differential.

Also, the spring means may be mounted behind the pressure ring as shown in FIG. 12, in which instance a desired number of clutch plates may be removed.

Figure 13A:
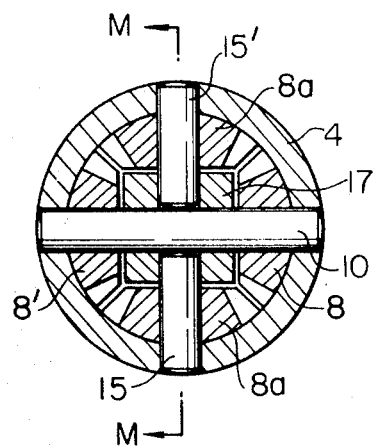
FIGS. 13a to 13d are views showing a modified form of the differential pinion used in the differential mechanism according to the invention.
Figure 13B:
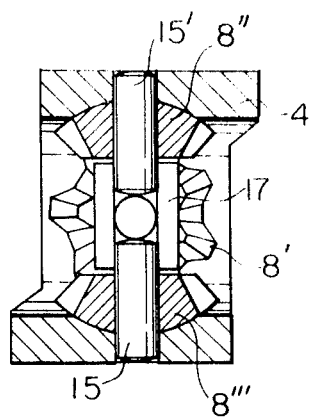
Figure 13C:
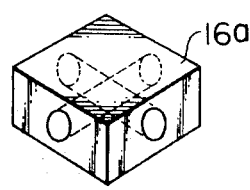
Figure 13D:
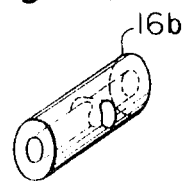
Figure 14:
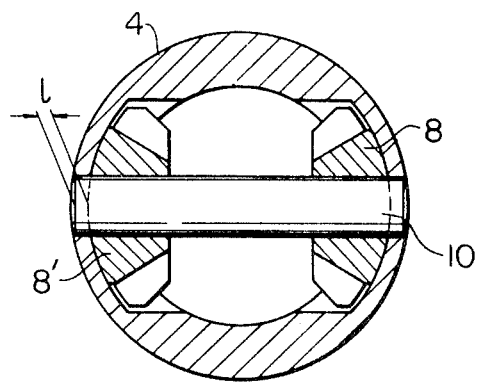
FIGS. 14 and 15 are sectional views taken along on line K–K of FIG. 2.
Figure 15:
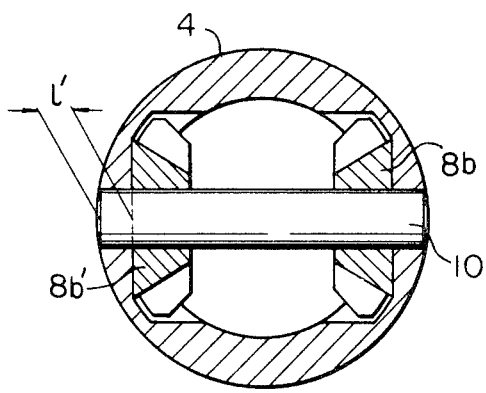

In the rear axle of an automobile using an engine of large driving capacity, the pinions of the differential gearing are susceptible to breakage due to the excess load exerted thereto. To avoid this, an increased number of pinions may be used to relieve each pinion from such excessive application of load. An example of such differential gearing using four pinions is illustrated in FIGS. 13a to 13d. As shown, split pinion mate shafts 15 and 15' are forced into the peripheral wall of the center ring 4 at a right angle to the cross-shaft 10. The shafts 15 and 15' fixedly carry two pinions 8a and 8a' which mate with the side gears 9 and 9' similarly to the pinions 8 and 8', The shaft 10 and split shafts 15 and 15' are rotatably carried by a unitary center piece 16. The center piece 16 may be shaped in a suitable manner, for example, as a rectangular body 16a as shown in FIG. 13c, or a cylindrical body 16b as shown in FIG. 13d.

Where usual conventional pinions are used in differential gearing such as illustrated in FIGS. 1 to 3, a problem is sometimes experienced from the fact that the center ring 4 has openings which are too small to adequately admit the pinions 8 and 8', and accordingly that the thickness $l$ of the wall at which the pinion mate shaft 10 is to be carried must necessarily be reduced at the sacrifice of its mechanical strength required to stably transfer a force between the mate shaft and center ring. Such problem may be solved if, as illustrated in FIG. 15, pinions 8b and 8b' are used with their outer faces finished to form flat surfaces to provide for increased thickness $l'$ of the wall.

If desired, there may be provided at the entire circumference of each of the pressure rings 2 and 2' an annular projection extending inwardly therefrom for slidably receiving the outer faces of the center ring 4 within the annular projections. In this instance, the center ring 4 may be positioned rather loosely within the differential case so as to make it easier to mount the center ring in the differential case while the mechanism is being assembled.

We claim:

1. An automotive differential mechanism comprising, in combination, a rotatable differential case including flange and housing halves for receiving a driving torque from a driving source; a pair of pressure rings splined to said housing half of said case, each of said pressure rings being provided with two opposite slopes in its inner sidewall; a center ring interposed between said pressure rings, each sidewall of said center ring being provided with two opposite slopes, wherein the two sets of two opposite slopes are symmetrical with each other with respect to the center point of said center ring, and correspond in contour to and mate respectively with said slopes in the walls of said pressure rings; a pair of clutch means splined to the housing half of said case; and a differential gearing combination including a pair of differential pinions and a pinion mate shaft fixed diametrically to said center ring and connecting said pair of pinions, and a pair of side gears mating with said pinions and having bosses which extend outwardly from said side gears for providing a splined connection to said clutch means.

2. A mechanism according to claim 1, wherein said two opposite slopes provided in each pressure ring are directed outwardly of the pressure ring to form a wedge portion with a flat top, and said two opposite slopes provided in each sidewall of said center ring are directed inwardly of said center ring to form a recess portion with flat bottom.

3. A mechanism according to claim 1, wherein said two opposite slopes provided in each pressure ring are directed inwardly of said pressure ring to form a recess portion with a flat bottom and said two opposite slopes provided in each sidewall of said center ring are directed outwardly of said center ring to form a wedge portion with a flat top.

4. A mechanism according to claim 1, wherein said center ring is mounted in said differential case with a clearance provided between the center ring and differential case, said clearance increasing toward the circumferential edges of the center ring.

5. A mechanism according to claim 1, wherein a pair of spring means are interposed respectively between said center ring and said pressure rings.

6. A mechanism according to claim 1, wherein a pair of spring means are interposed respectively between the said center ring and said pair of clutch means.

7. A mechanism according to claim 1, wherein said differential gearing combination has a second pair of pinions and a second pinion mate shaft fixed diametrically at a right angle to the first named pinion mate shaft, said second pinions being connected by said second pinion mate shaft and mating with said gears.

8. A mechanism according to claim 7, further comprising a unitary center piece, wherein the two pinion mate shafts are rotatably carried by said unitary center piece.

9. A mechanism according to claim 1, wherein each of said differential pinions has a flat outer face.